3,333,422
SUBIRRIGATION CONDUIT
William M. Neyland, 156 Louisiana Ave.,
Corpus Christi, Tex. 78404
Filed Aug. 30, 1965, Ser. No. 483,565
4 Claims. (Cl. 61—13)

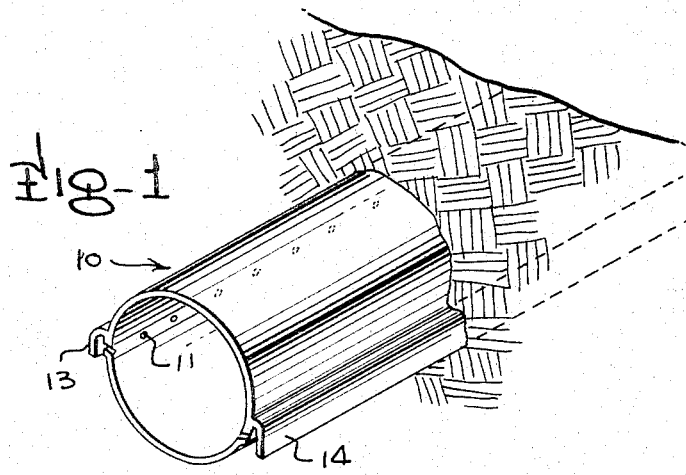
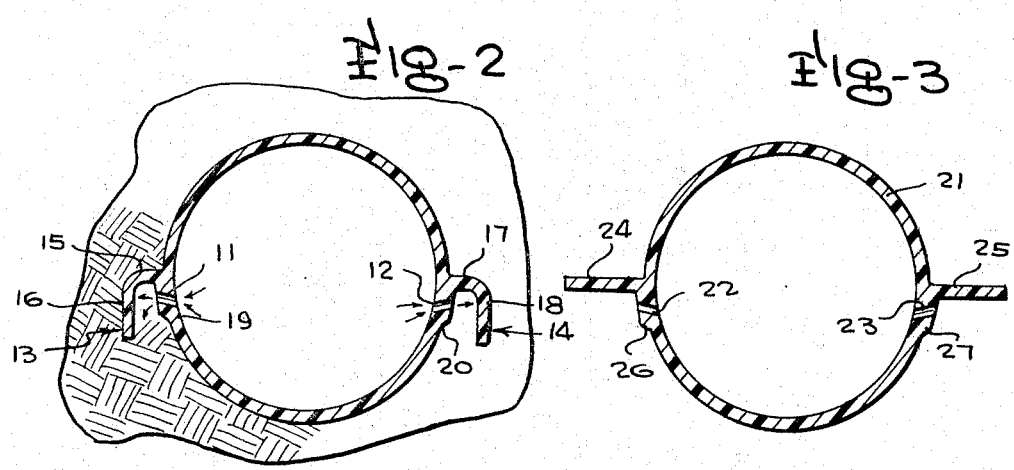
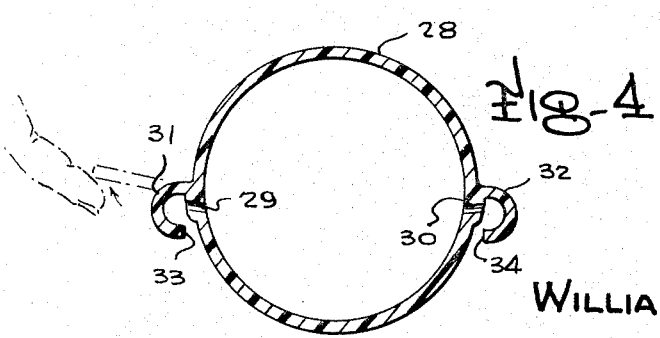
INVENTOR
WILLIAM M. NEYLAND
BY Mason, Fenwick & Lawrence
ATTORNEYS United States Patent Office 3,333,422
Patented Aug. 1, 1967

ABSTRACT OF THE DISCLOSURE

A tubular plastic conduit having flanges extending along its length with a plurality of liquid emitting openings located in a thickened wall rib portion of the conduit adjacent each flange.

This invention relates to a conduit structure and more particularly to a conduit structure suitable for use in subirrigation systems.

In conventional subirrigation systems, normally there is employed a system of interconnected conduits embedded in the ground, having series of openings therein through which a supply of water, air, chemicals or other fluid substances are discharged into the soil. Usually, these openings are relatively small in size and often become clogged by the surrounding soil. This generally results either in a breakdown of the entire system or at least the requirement of increased pump pressures to clear the clogged openings.

It also has been found in the use of conventional tubular conduits which are employed in subirrigation systems that some difficulty is incurred in setting the conduits in the desired orientation when a system of conduits initially is laid out. Generally, additional wasted time is incurred in first orientating the conduits by locating the openings on opposite sides thereof and then maintaining them in the proper orientation after they have been placed in position, connected together and embedded in the ground.

Accordingly, the general object of this invention is to provide a novel conduit structure.

Another object of this invention is to provide an improved conduit structure suitable for use in subirrigation systems.

A further object of this invention is to provide an improved conduit structure suitable for use in subirrigation systems, which is adapted to effectively distribute and discharge a fluid substance into the soil in which the system is embedded.

A still further object of this invention is to provide an improved conduit structure suitable for use in subirrigation systems, having a series of openings through which a fluid substance is discharged into the soil, including means for preventing such openings from becoming clogged by the surrounding soil.

Another object of this invention is to provide an improved conduit structure suitable for use in subirrigation systems, which can easily be orientated when placed in position in the ground.

A further object of this invention is to provide an improved conduit structure which will be maintained in the proper orientation when connected to other similar conduits and embedded in the ground.

A still further object of this invention is to provide an improved conduit structure suitable for use in subirrigation systems which is simple in construction and inexpensive to manufacture.

Other objects and advantages of the present invention will become more apparent to those persons skilled in the art, from the following description when taken in conjunction with the accompanying drawings, wherein:

FIGURE 1 is a perspective view of an embodiment of the invention;

FIGURE 2 is an enlarged cross-sectional view of the embodiment illustrated in FIGURE 1;

FIGURE 3 is a vertical cross-sectional view of a second embodiment of the invention; and FIGURE 4 is a vertical cross-sectional view of a third embodiment of the invention.

Briefly described, the present invention relates to a structure generally comprising a fluid passage means, the fluid passage means having at least one series of openings along at least a portion of the length thereof and the passage means having means disposed thereon including a portion thereof spaced from the passage means and shielding the openings. According to a more specific embodiment of the invention, there is provided a structure comprising a conduit, the conduit having at least one series of openings along at least a portion of the length thereof and the conduit having an outwardly projecting flange extending along the length of the conduit adjacent the series of openings.

Referring to FIGURES 1 and 2, there is illustrated a first embodiment of the invention. This embodiment includes an elongated tubular conduit 10, having a first series of openings 11 extending along the length on one side thereof and a second series of openings 12 extending along the length substantially on the opposite side thereof, through which a fluid substance carried by the conduit is discharged into the soil in which the tubular conduit is embedded. Formed integral with the wall of the conduit member on opposite sides of the conduit member adjacent the series of openings 11 and 12, are flange members 13 and 14 which extend along the lengths of the series of openings 11 and 12. The flange member 13 includes an outwardly projecting portion 15 and a portion 16 disposed at an angle relative to the portion 15 and extending across the openings 11, in spaced relation relative to the conduit member. Similarly, the flange member 14 includes an outwardly projecting portion 17 and a portion 18 disposed at an angle relative to the flange portion 17 and extending across the openings 12 in spaced relation relative to the conduit member. Essentially, the flanges 13 and 14 act as shields for the openings 11 and 12, preventing the surrounding soil from contacting the conduit member and clogging the openings 11 and 12. The flow of fluid through the openings 11 and 12 is not obstructed, in that it is merely directed downwardly relative to FIGURE 2, into the surrounding soil.

It will be noted that the disposiion of the flanges 13 and 14 permits the locations of the openings 11 and 12 to be readily determined, so that the conduit can be placed in the desired position in the ground to make up the subirrigation system. Once placed in position in the ground, the flanges 13 and 14 prevent the conduit member from being displaced when the subirrigation system is connected together and covered with soil.

The wall sections 19 and 20 of the conduit member are made thicker than the other wall sections of the conduit, to avoid any weakened areas in the conduit in the vicinity of the series of openings 11 and 12.

The embodiment of the invention illustrated in FIGURES 1 and 2 can be constructed of any suitable material and by any suitable method. It is preferred, however, that the conduit be constructed of a corrosive resistant material such as plastic. Furthermore, it is preferred that the conduit be constructed by an extrusion method with the flange members 13 and 14 being formed integral with the tubular conduit member. The series of openings 11 and 12 also can be formed by any suitable stamping, punching, drilling or other methods. It also is preferred that the structure be constructed of a flexible material which would permit the series of openings 11 and 12 to be formed after the flanges 13 and 18 have been formed, merely by bending the flange portions 16 and 18 upwardly. In addition, by making the flanges flexible, this will permit the openings 11 and 12 to be easily inspected and cleaned.

Referring to FIGURE 3 of the drawings, there is illustrated a second embodiment of the invention which is similar to the embodiment illustrated in FIGURES 1 and 2. This embodiment includes a tubular conduit member 21, having a series of openings 22 extending along one side of the conduit member and a second series of openings 23 extending along the opposite side of the conduit member. The embodiment also includes outwardly projecting flanges 24 and 25 which are disposed adjacent the series of openings 22 and 23 and extend along the length of the conduit member. Those wall portions of the conduit member, including the series of openings 22 and 23, are made of greater thickness than the other portions of the conduit member, as at 26 and 27. It is contemplated that the embodiment illustrated in FIGURE 3 will be formed from a corrosive resistant material such as plastic, and will be formed preferably by an extrusion method.

FIGURE 4 illustrates a third embodiment of the invention. This embodiment also is similar to the embodiment illustrated in FIGURES 1 and 2, and includes a tubular conduit member 28 having a series of openings 29 extending along one side of the conduit member and a second series of openings 30 extending along the opposite side of the conduit member. This embodiment also is provided with curved flanges 31 and 32 which are disposed adjacent the series of openings 29 and 30 and extend along the length of the conduit. The flanges 31 and 32 preferably are formed integrally with the conduit member and are curved inwardly across the openings 29 and 30, having the free edges 33 and 34 thereof being spaced from the conduit member to permit passage of the fluid discharged through the openings 29 and 30. Those wall portions of the conduit member, including the series of openings 29 and 30, are formed thicker than the other wall portions of the conduit member, as in the earlier described embodiments. The embodiment illustrated in FIGURE 4 also preferably is formed of a corrosive resistant material, such as plastic, and is constructed preferably by an extrusion method. It also is preferred that the embodiment be constructed of a flexible material, to permit the flanges to be displaced as illustrated in FIGURE 4, for the purpose of removing any soil or other particles which may tend to obstruct the passage of fluid through the series of openings 29 and 30 or the passageways provided between the free edges 33 and 34 of the flanges and the conduit member.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A conduit structure formed of plastic comprising an elongated tubular member having an elongated wall portion rib extending along its length and being of greater wall thickness than the remainder of said tubular member, a series of openings extending through said rib and a flange extending outwardly from said rib so as to provide a structure of great dimensional stability.

2. The conduit of claim 1 wherein said flange extends outwardly radially from said conduit.

3. The device of claim 1 wherein said flange extends outwardly radially for a short distance from said conduit and includes a terminal edge portion oriented over said openings.

4. The device of claim 3 wherein said terminal edge portion is curved in shape.

References Cited

UNITED STATES PATENTS

| 460,352 | 9/1891 | Reading | 61—11 |
| 1,664,734 | 4/1928 | Brundy | 166—234 |
| 3,080,124 | 3/1963 | Rathmann | 239—450 |

FOREIGN PATENTS

| 1,305,083 | 8/1962 | France. |
| 922,745 | 1/1955 | Germany. |
| 511,677 | 8/1939 | Great Britain. |

ERNEST R. PURSER, *Primary Examiner.*